(12) United States Patent
Ratnakumar et al.

(10) Patent No.: US 7,291,387 B2
(45) Date of Patent: Nov. 6, 2007

(54) PACKAGING FILM

(75) Inventors: Rohan Ratnakumar, Wigton (GB); Neill Dutton, Carlisle (GB)

(73) Assignee: Innovia Films Limited, Cumbria (GB)

( * ) Notice: Subject to any disclaimer, the term of this patent is extended or adjusted under 35 U.S.C. 154(b) by 422 days.

(21) Appl. No.: 10/477,187

(22) PCT Filed: May 2, 2002

(86) PCT No.: PCT/EP02/04828

§ 371 (c)(1), (2), (4) Date: Jun. 15, 2004

(87) PCT Pub. No.: WO03/002344

PCT Pub. Date: Jan. 9, 2003

(65) Prior Publication Data

US 2004/0208911 A1 Oct. 21, 2004

(30) Foreign Application Priority Data

May 11, 2001 (GB) .................................. 01115088

(51) Int. Cl.
*B32B 27/08* (2006.01)
*B32B 27/30* (2006.01)
(52) U.S. Cl. .................. 428/349; 428/348; 428/516
(58) Field of Classification Search ................ 428/349, 428/348, 516
See application file for complete search history.

(56) References Cited

U.S. PATENT DOCUMENTS

| | | | | |
|---|---|---|---|---|
| 5,419,960 | A | * | 5/1995 | Touhsaent .................... 428/331 |
| 5,451,460 | A | * | 9/1995 | Lu et al. ...................... 428/349 |
| 5,843,582 | A | * | 12/1998 | McGee ......................... 428/520 |
| 6,013,353 | A | | 1/2000 | Touhsaent |
| 6,764,751 | B2 | * | 7/2004 | Poirier ......................... 428/215 |

FOREIGN PATENT DOCUMENTS

| | | |
|---|---|---|
| EP | 0 549 234 | 6/1993 |
| WO | 00 63309 | 10/2000 |

* cited by examiner

OTHER PUBLICATIONS

DATABASE WPI, Section Ch, Week 199320, Derwent Publications Ltd., London, GB; Class A17, An 1993-164012 'Abstract of JP 05 096694A, Apr. 20, 1993'.

*Primary Examiner*—David W. Wu
*Assistant Examiner*—Satya Sastri
(74) *Attorney, Agent, or Firm*—Wenderoth, Lind & Ponack, L.L.P.

(57) ABSTRACT

A self supporting film of polyolefinic polymer(s) is described, the film having a first and a second surface where a first exposed surface of the film (A) comprises a polymeric low temperature sealable coating (LTSC) and where the second exposed surface of the film (B) comprises an olefinic polymer capable of forming a seal to the LTSC at a minimum temperature of at most about 100° C. when measured at 15 psi for 2 seconds, such that the first and second surfaces of the film have a mutual heat seal strength (A to B) of at least about 200 g/25 mm, when measured at 15 psi for 2 seconds at 120° C.; where the LTSC also comprises: (a) an anti-block additive in from an effective amount to about 15% by dry weight of the coating (b) a non-ionic anti-mist additive having an HLB value of up to about 20; and (c) optionally an anti-slip additive of a mean particle size of from about 3 to about 5 microns in an effective amount up to about 0.5% by dry weight of the coating.

21 Claims, 3 Drawing Sheets

Anti-mist performance / cold fog test

PACKAGING FILM

The invention relates to packaging films. Such films may be useful for packaging food or non-food items and/or for forming bags designed to hold such items.

BACKGROUND OF THE INVENTION

Plastic films comprising polyolefinic polymers, e.g. of oriented polypropylene (OPP) are widely used in food and non-food packaging and containers because of their desirable properties, such as resistance to the transmission of moisture, air, deleterious flavours and the like, as well as their excellent mechanical properties. However, a disadvantage of many of these polyolefinic films is the difficulty they have in readily forming seals at low temperatures either between the same surface of the film (denoted A to A sealability) as well as with the reverse side (denoted A to B sealability).

Prior art sealable BOPP films have been coated with PVdC (poly vinylidene chloride) coatings on one or both sides which provides a sealable coating as well as a high barrier to gases (such as oxygen). Such PVdC coated films are currently used mainly in the salad and fresh produce packaging markets but also for confectionery and biscuit packaging. However there is a market preference for non PVdC materials on environmental grounds. It is therefore desired to find an A/B sealable film with good anti-mist properties and a wide sealing range to replace PVdC films and which is preferably chlorine-free. A replacement product should also have robust sealability under wet and contaminated conditions.

It has been proposed to overcoat one or both surfaces of a film with a low temperature sealable coating (LTSC) which will readily A to A seal as well A to B seal after optional suitable treatment of the reverse surface (B side) and which is chlorine free.

U.S. Pat. No. 5,451,460 (Mobil) describes a heat sealable anti-fog coating composition. U.S. Pat. No. 5,419,960 (Mobil) discloses a base polymer film coated with a low temperature sealable coating (LTSC) comprising a copolymer of about 65% to 95% ethylene and about 5 to 35% of acrylic or methacrylic acid based on the weight of polymer, where about 2 to about 80% of the carboxylate groups are neutralised with metal ions from groups Ia, IIa or IIb of the Periodic Table.

U.S. Pat. No. 6,013,353 discloses a multilayer film comprising a film substrate having a polypropylene core layer (OPP) with skin layers on each side of the core comprising polymers of lower melting temperature than the core. The film is metallised on at least one side and coated therein with a polymeric, low temperature sealable coating (LTSC) comprising a copolymer of about 10 to 35 wt. % of at least one α, β-ethylenically unsaturated carboxylic acid, e.g., acrylic or methacrylic acid, with about 65 to 90 wt. % of ethylene, an alkyl acrylate or methacrylate, acrylonitrile, or mixtures thereof. The LTSC is stated to protect the metal coat and provide a film with improved A to B sealability.

WO 00/63309 (Du Pont) discloses a low temperature sealing compositions of EAA copolymers which have a low melt flow index (MFI) and are therefore easier to process.

However films with a LTSC also have a tendency to block (i.e. adhere together) as well as seal. Therefore it would be desirable to provide films with a LTSC to readily provide improved sealability but which also have a reduced tendency to block on the reel.

Prior art films with a LTSC also tend to exhibit poor anti-mist performance than those without a LTSC so it would be desirable to provide improved LTSC films which provide satisfactory or improved anti-mist performance to prior art LTSC films.

Thus it is an object of the invention to solve some or all or the problems described herein with prior art films coated with known LTSCs. It is a preferred object of the invention to provide films particularly suitable for packaging applications which have an good (more preferably optimum) balance between properties such as sealability at low temperatures (especially A to B), reduced tendency to block and satisfactory anti-mist performance.

Therefore broadly in accordance with the present invention there is provided a self supporting film of polyolefinic polymer(s), the film having a first and a second surface where a first exposed surface of the film (surface 'A') comprises a polymeric low temperature sealable coating (LTSC) and where the second exposed surface of the film (reverse side surface 'B') comprises an olefinic polymer capable of forming a seal to the LTSC at a minimum temperature of at most about 100° C. when measured at 15 psi for 2 seconds, such that the first and second surfaces of the film have a mutual heat seal strength (A to B) of at least about 200 g/25 mm, when measured at 15 psi for 2 seconds at 120° C.; where the LTSC also comprises:

(a) an anti-block additive in from an effective amount to about 15% by dry weight of the coating to give a static coefficient of friction of less than about 0.9 and a dynamic coefficient of friction less than about 0.75, such the first and second surfaces have a mutual blocking strength (A to B) of less than about 25 g/25 mm measured at 40° C. and 0.5 psi for one hour;

(b) a non-ionic anti-mist additive having an HLB value of from about 10 to about 20 in an effective amount to about 15% by dry weight of the coating; such that the film exhibits a substantially clear appearance on exposure to a relative humidity of at least 30% at 5° C. after one hour; and (c) optionally an anti-slip additive of a mean particle size of from about 3 to about 5 microns in an effective amount up to about 0.5% by dry weight of the coating

SUMMARY OF THE INVENTION

DETAILED DESCRIPTION OF THE INVENTION

Figure 1:
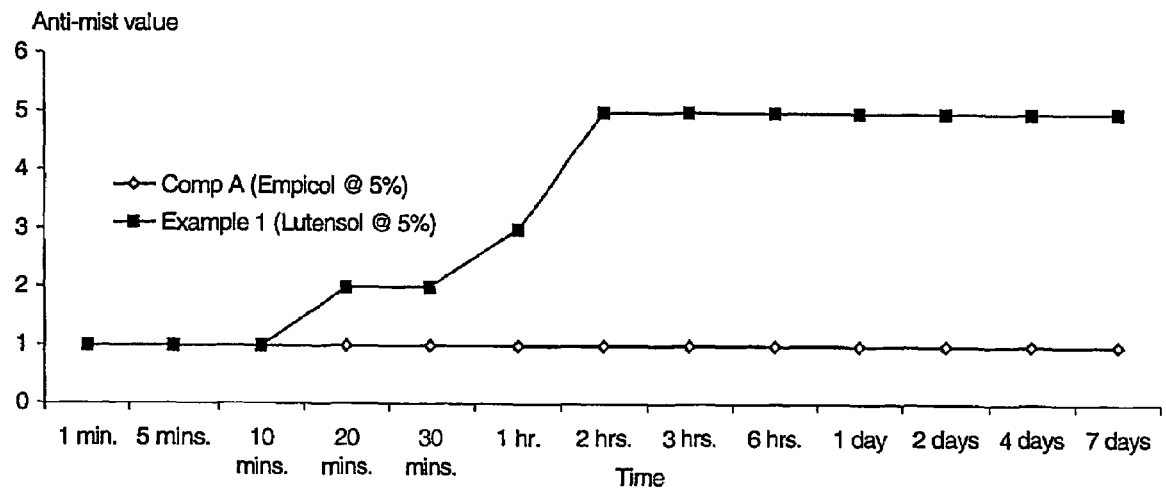
FIG. 1 shows the anti-mist properties of a film of the invention using 5% of Lutensol AB as an anti-mist agent (Example 1) compared to a prior art film using the anionic Empicol CBJS as an anti-mist agent (Comp A) and corresponds to the data in Table 1.

Preferred films of the invention may also exhibit one or more of the following properties:
a mutual heat seal strength (A to B) of at least about 400 g/25 mm when measured at 15 psi for 2 seconds at 120° C.;
a blocking strength (A to B) of less than about 25 g/25 mm measured at 40° C. and 0.5 psi for one hour; and/or
at a relative humidity (RH) of 30% or more (preferably 50% or more) exhibit a substantially clear appearance after at least 30 minutes at 2° C. after prior exposure to a temperature of 30° C. or more for at least 30 minutes.

Particle sizes as given herein may be measured by any suitable and conventional method known to those skilled in the art for example using a Coulter LS100.

It has been found that the film of this invention is suitable for packaging applications requiring an LTSC with good anti-block and anti-mist properties such as foodstuffs, for example fresh produce such as lettuce and/or salads.

LTSC

Conveniently the LTSC (low temperature sealable coating) used on films of the present invention is substantially chlorine free.

Preferably the LTSC comprises: one or more copolymer(s) (denoted herein as LTSC copolymer(s)) obtainable from at least one first polymer precursor and at least one second polymer precursor where:
(i) the first polymer precursor(s) comprises at least one α,β-ethylenically unsaturated carboxylic acid and/or other suitable derivatives thereof, such as acrylates and/or acrylonitriles,
(ii) the second polymer precursor(s) comprises at least one olefinic polymer precursor.

More preferably the first polymer precursor(s) are selected from one or more $C_{1-4}$alkyl(meth)acrylic acids; most preferably from: acrylic acid, methacrylic acid, maleic acid, crotonic acid, itaconic acid and/or citraconic acid and/or suitable mixtures thereof; for example acrylic acid.

Preferably the first polymer precursor(s) is present in the LTSC copolymer in an amount from about 2% to about 35%, more preferably from about 10% to about 35%, most preferably from about 10% to about 30%, for example 15% to about 25% by weight of the copolymer.

More preferably the second polymer precursor(s) are selected from: ethylene; propylene, butylene and/or suitable mixtures thereof.

Preferably the second polymer precursor(s) is present in the LTSC copolymer is present in an amount from about 65% to about 98%, more preferably from about 65% to about 95%, most preferably from about 70% to about 90%, for example 75% to about 85% by weight of the copolymer.

As used herein copolymers derived from acrylic acid monomers are denoted EM copolymers and those derived from methacrylic acid monomers are denoted EMA copolymers. EAA copolymers are more preferred.

Preferably the LTSC copolymer is a branched interpolymer, more preferably having a branching parameter of from about 0.6 to about 1, most preferably from about 0.6 to about 0.85.

Preferably the LTSC has a melt flow index of from about 10 to about 100, more preferably from about 20 to about 80 g/10 min (at 190° C., 2.16 kg).

Preferably the LTSC has a melting point from about 75° C. to about 90° C.

Preferably the LTSC has a crystallinity of from about 25 to about 70 J/g.

Preferably the LTSC has a polydispersity of from about 2 to about 7.

The LTSC copolymer may have a number average molecular weight (Mn) of from about 2,000 to about 50,000, preferably from about 4,000 to about 30,000, most preferably less than about 25,000 daltons.

The LTSC copolymer may have a weight average molecular weight (Mw) of less than about 130,000 daltons.

The LTSC may be applied to the surface of the film with or without a primer.

The LTSC copolymer may be water dispersible and thus may be obtained as a solution, dispersion and/or emulsion in an aqueous medium such as water.

The carboxylic acid groups on the copolymer may be neutralised by any suitable means but preferably by ammonia, preferably in an amount from about 50% to about 300%, more preferably 150% to about 250% of the carboxylic acid groups (i.e. an excess of base). Thus for example the copolymer may be obtained as an ammonium salt thereof such as in an aqueous ammonia solution. When such a copolymer is dried, ammonia is given off and the ionised and water sensitive carboxylate groups are converted to free carboxyl groups.

Optionally from about 2% to about 80%, more preferably from 10% to about 50% (by stiochiometry) of any carboxylate groups therein comprise as counter Ions alkali metal cations and/or alkaline earth metal cations, more preferably sodium, potassium, lithium, calcium and/or zinc ions; most preferably sodium.

Optionally further ingredients may be added to improve the water resistance of such groups such as a solution or dispersion comprising one or more alkali metal and/or alkaline earth metal cations, preferably, sodium, potassium, lithium, calcium and/or zinc ions, and most preferably sodium ions, for example in the form of their hydroxides. The quantity of such metallic ions may be in the range sufficient to neutralise the carboxyl groups, for example, in an amount from about 2% to about 80%, preferably from about 10% to about 50% of the total carboxylate groups on the copolymer. The presence of such metallic ions has been found in many cases to result in an improvement in certain desired properties of the coating such as coefficient of friction (COF), hot tack, and/or blocking, without causing unacceptable degradation in other desired properties of the coating such as minimum seal temperature.

When the LTSC copolymer is an EAA copolymer of 80 wt. % of ethylene and 20 wt. % of acrylic acid and the neutralising metal ions are sodium ions added as sodium hydroxide, then the amount of sodium hydroxide may be from about 0.3% to about 9%; preferably from about 1% to about 6% by weight of the EM copolymer. For the purpose of determining the weight percentage herein all the carboxylate groups of the ethylene copolymer are assumed to be in their free carboxyl (—COOH) form.

Examples of suitable LTSC EAA copolymers for use on films of the present invention comprise those available commercially from Paramelt under the trade mark Aquaseal (such as Aquaseal® 1211) and from Michelman under the trade mark Primacor® 4983 and/or those used in the Examples of the invention herein.

Anti-Block Additives

The Anti-block additive used as component (a) of the LTSC herein may comprise one or more of the following waxes and/or mixtures thereof: dispersed waxes such as carnauba and/or microcrystalline wax; natural waxes such as paraffin wax, beeswax, japan wax, and/or montan wax; and/or synthetic waxes such as hydrogenated castor oil, chlorinated hydrocarbon waxes and/or long chain fatty acid amides.

Preferred anti-block additives are micronised waxes; more preferably aqueous emulsions of polyethylene wax (such as those available commercially from Keim-Additec under the trade name Ultralube MD 2003); those waxes available commercially from Paramelt under the trade mark Aquaseal® 1205; those waxes used in the Examples of the invention herein; and/or mixtures thereof.

The anti-block additive may be present in the LTSC in an amount of from about 2% to about 15%, preferably from about 5% to about 12%, more preferably from about 8% to about to about 12% by dry weight of the coating.

Preferred anti-block additives have a mean particle size of from about 0.1 microns to about 0.5 microns.

When incorporated into the LTSC the anti-block additive may exhibit other properties such as improving the slip and/or anti-mist resistance of the film.

Anti-Mist Additives

Preferably the anti-mist additive is present in an amount from about 0.1% to about 10% by dry weight of the coating.

Conveniently the non ionic anti-mist additive has an HLB value up to about 14.5.

Preferably the non ionic anti-mist additive has an HLB value from about 10 to about 20, more preferably from about 10 to about 14, most preferably from about 12.0 to about 14.0, for example about 13.0.

Preferred anti-mist additives are selected from: primary alcohol ethoxylates, secondary alcohol ethoxylates and/or nonylphenol alcohol ethoxylates.

Advantageous anti-mist additives comprise one or more compounds of Formula 1

   Formula 1 where
n represents an integer from 6 to 10 inclusive; more advantageously is from 7 to 9, most advantageously=8; and
$R^1$ is a $C_{10-20}$hydrocarbo, more advantageously is $C_{10-16}$hydrocarbyl, most advantageously is a straight chain $C_{12-14}$alkyl.

More preferred anti-mist additives comprise one or more of:

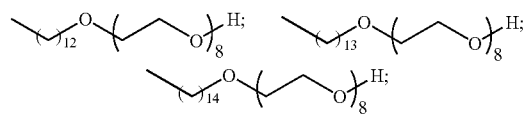

and/or mixtures thereof.

Most preferred anti-mist additives are those compounds available commercially from BASF under the trade name Lutensol (such as Lutensol A8) and/or those used in the Examples of the invention herein.

The term 'hydrocarbo group' as used herein denotes any univalent or multivalent moiety (optionally attached to one or more other moieties) which consists of one or more hydrogen atoms and one or more carbon atoms. Hydrocarbo groups may comprise one or more of the following groups.

Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valencies of which are not engaged in a double bond (for example alkylene). Hydrocarbylidene groups comprise divalent groups (represented by "$R_2C=$") formed by removing two hydrogen atoms from the same carbon atom of a hydrocarbon, the free valencies of which are engaged in a double bond (for example alkylidene). Hydrocarbylidyne groups comprise trivalent groups (represented by "$RC\equiv$"), formed by removing three hydrogen atoms from the same carbon atom of a hydrocarbon the free valencies of which are engaged in a triple bond (for example alkylidyne). Hydrocarbo groups may comprise one or more saturated groups (for example denoted by alkyl), one or more groups with one or more unsaturated double ands/or triple bonds (for example denoted by alkenyl and/or alkynyl respectively) and/or one or more aromatic groups (e.g. aryl) and/or combinations thereof within the same moiety and where indicated may be substituted with other functional groups.

Film Surface—Side A

The surface of the film (A side) to which the LTSC is coated is preferably suitably treated to increase adherence to the LTSC, preferably by a flame and/or corona discharge treatment and/or by a suitable primer coating for example comprising polyethyleneimine.

Film Surface—Side B

The surface of the film opposite to the LTSC and which is sealable thereto at low temperature (B side) comprises an olefinic polymer forming the exposed surface of the film (optionally forming a skin on an underlying core layer). The olefinic polymer may comprise a predominate amount (preferably greater than about 50% by weight) of olefin and thus may be a copolymer obtainable from at least 50% of an olefinic polymer precursor or homo-polymer obtained from an olefinic polymer precursor.

More preferably the olefinic polymer is obtainable from at least 70%, most preferably at least 80% of an olefinic polymer precursor.

Preferably the polyolefinic polymer of side B is a homopolymer or copolymer obtainable from monomer(s) comprising ethylene, propylene and/or butylene.

Preferably the polyolefinic polymer of side B is obtainable from the same polymer precursor as the second polymer precursor of the LTSC copolymer of side A.

If the skin polymer is a copolymer, preferably each non-olefinic polymer precursor forms no more than about 10% by weight of the copolymer, and 45% in total.

If the LTSC comprises a EEA copolymer then the skin polymer of side B may comprise polymer precursors selected from EEA, EVA (with no more than 5% acid), EVOH, ethylene and/or polyethylene.

To achieve the desired sealability preferably the polyolefinic polymer is matched to the second polymer precursor of the LTSC copolymer on side A. Thus more preferably the predominately olefinic polymer precursor of the skin layer of side B is the same as the second polymer precursor of the LTSC copolymer of side A.

More preferred olefinic polymers are homopolymers obtained from ethylene, propylene or butylene monomers. For example a suitable polyolefin is the polyethylene commercially available from DSM under the trade name Standulex 405F and having the following properties: crystallisation from melt at 125° C., $\Delta H=165$ $Jg^{-1}$; cooling at 20° C.

per min to 105° C., ΔH=150 Jg$^{-1}$; density 0.936 g; melt flow index (MFI) 4.4 g (10 min)-1 measured as described in ASTM D1238.

The sealable side B surface of the film may be applied thereto and/or formed thereon by any suitable method provided it exhibits the desired properties specified above. Thus for example the surface may be formed by coextrusion, hot melt coating, coating from an aqueous or solvent coating and/or lamination.

Optional LTSC Component (c)—Anti-Slip Agent

The LTSC may also contain as optional component (c) further particulate material useful as a slip agent such as one or more of the following inorganic materials: colloidal silica, amorphous silica, calcium carbonate, calcium silicate, diatomaceous earth, bentonite and/or finely divided clays. Amorphous silica comprises particles agglomerated from smaller particles and which have an average particle size preferably from about 2 microns to about 9 microns, more preferably from about 3 microns to about 5 microns.

The anti-slip agent may be present in the LTSC in an amount from about 0.1% to about 0.5%, preferably from about 0.1% to about 0.2% by weight of the coating.

Other Optional LTSC Components

Other additives which may be included in the LTSC comprise:

other particulate materials such as talc which may be present in an amount up to about 2% by weight of the coating;

cross-linking agents such as melamine formaldehyde resins which may be present in an amount up to about 20% by weight of the coating;

anti-tack agents such as high softening point polymers for example polymethacrylate (PMA), polyvinyl chloride (PVC), polyvinylidene chloride (PVdC); PMA being preferred as it is chlorine free;

and/or anti-bacterial agent(s) which may be present in an effective amount.

Other Aspects of Film Structure

The films of the invention may comprise a core layer and a first and/or second polymeric skin layer thereon forming either or both respective first and second exposed surfaces. For example films of the invention may comprise a biaxially oriented film substrate with an oriented polypropylene homopolymer (OPP) core layer preferably from about 80% to about 99% of the total thickness of the film and skin layer(s) on one or both sides thereon of a thickness from about 1% to about 10% of the total film thickness. Films of the invention may have any suitable thickness for example from about 10 microns to about 50 microns.

Core Layer

The polymer of the core layer of the film of this invention generally has mechanical properties considered necessary or desirable in the film. In many cases, such polymer is a polyolefin having a melting point, for example, of at least about 125° C. and up to for example, about 190° C., and a relatively high degree of crystallinity. A particularly desirable polyolefin making up the core layer is an isotactic polypropylene homopolymer which is, for example, about 93 to 99% isotactic and has a crystallinity of about 70 to 80%, and a melting point, for example, of about 145° C. or higher, e.g., up to about 167° C. Another desirable polymer suitable for the core layer of the film of this invention is a high density polyethylene (HDPE), which is a substantially linear polymer having a density, for example, of about 0.952 to 0.962 g/cc, a melting point of, for example, about 130° C. to 148° C. and a substantial degree of crystallinity.

Other Aspects of Film

Films of the present invention may comprises multi-layers, one or more of which may be formed by coextrusion and/or be biaxially oriented.

For some purposes, it may be desirable to produce the polymer substrate comprising the core and one or two adjacent skin layers by a cast film or chill roll extrusion process rather than a coextrusion and orientation process. In this case, the final polymer substrate is essentially unoriented and the final film is generally much less stiff than films in which the substrate is prepared by a coextrusion and orientation process.

Before applying subsequent metal, primer or polymeric film-forming coatings to the surface of the films of the invention, surfaces intended to receive such coatings may be treated to insure that the coatings will strongly adhere to the film to reduce the possibility of such coatings peeling or being stripped from the film. Such treatments are known in the art and comprise techniques such as film chlorination (i.e. exposure of the film to gaseous chlorine), treatment with oxidising agents such as chromic acid, hot air or steam treatment, flame treatment and/or corona discharge treatment. Flame or corona discharge treatment is preferred.

The LTSC is applied to the surface of the polymer film in any suitable manner such as by gravure coating, roll coating, dipping and/or spraying. Excess solution can be removed by any suitable means such as squeeze rolls and/or doctor knives. The coatings may be applied in a sufficient amount so after drying there will be a smooth, evenly distributed layer on the film of from about 0.2 g/m$^2$ to about 1 g/m$^2$. In general, the thickness of the applied LTSC is such that it is sufficient to impart the desired characteristics to the substrate polymer film.

The coating once applied to the film is subsequently dried by hot air, radiant heat or by any other suitable means thereby providing a non-water soluble, adherent, glossy coated film product useful, for example, as a packaging film.

Optionally, another film (the "laminating film") may be bonded to a surface of a film of this invention to form side B for the purpose of improving the mechanical properties such as tear strength, machinability, increasing the stiffness, protecting a printed pattern and/or providing hermetic seals of the film. This laminating film may be bonded to uncoated side of the film (B side), either after a printed pattern has been applied to the sealable coating or in the absence of such printed pattern, or the laminated film may be bonded to a surface without any sealable coating.

The laminating film may, for example, comprise a polymer having superior mechanical properties, (such as high density polyethylene (HDPE), and/or isotactic polypropylene homopolymer) which is bonded to the film with an adhesive molten polymer having a lower melting point than the laminating polymer (such as low density polyethylene (LDPE)). Alternatively, the laminating film may comprise a major layer of a polymer of superior mechanical properties and a minor layer of a polymer of a lower melting temperature. However in either case the film must possess sufficient properties to be heat sealable at the specified low temperatures to the LTSC of side A. Then the lamination may be accomplished by pressing the minor layer of the laminating film against the desired surface of the film to be laminated at a temperature high enough to render the minor layer tacky. The methods and equipment necessary to accomplish the described bonding are well-known in the art.

The Figures herein illustrate properties of the Films of the invention compared to prior art films.

FIG. 1 shows the anti-mist properties of a film of the invention using 5% of Lutensol A8 as an anti-mist agent (Example 1) compared to a prior art film using the anionic Empicol CBJS as an anti-mist agent (Comp A) and corresponds to the data in Table 1 herein.

Figure 2:
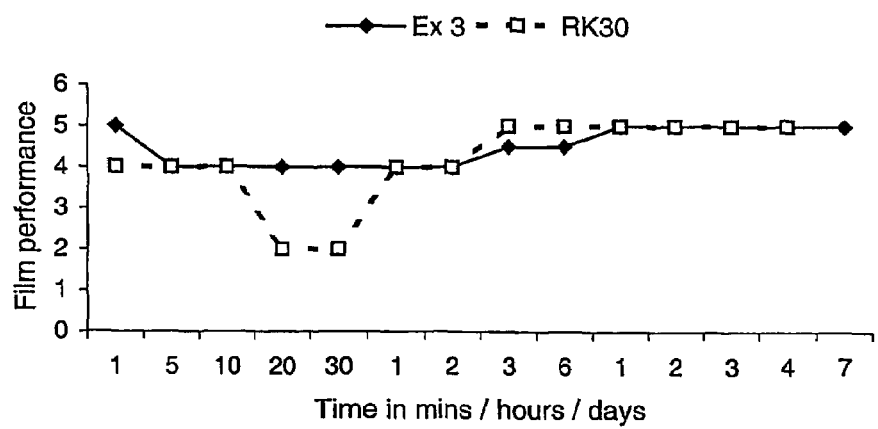
FIG. 2 shows the anti-mist properties of a film of the invention (Example 3) compared to the prior art film available from UCB under the trade designation RK30 and corresponds to the data in Table 2C.

FIG. 2 shows the anti-mist properties of a film of the invention (Example 3) compared to the a prior art film available from UCB under the trade designation RK30 and corresponds to the data in Table 2C herein.

Figure 3:
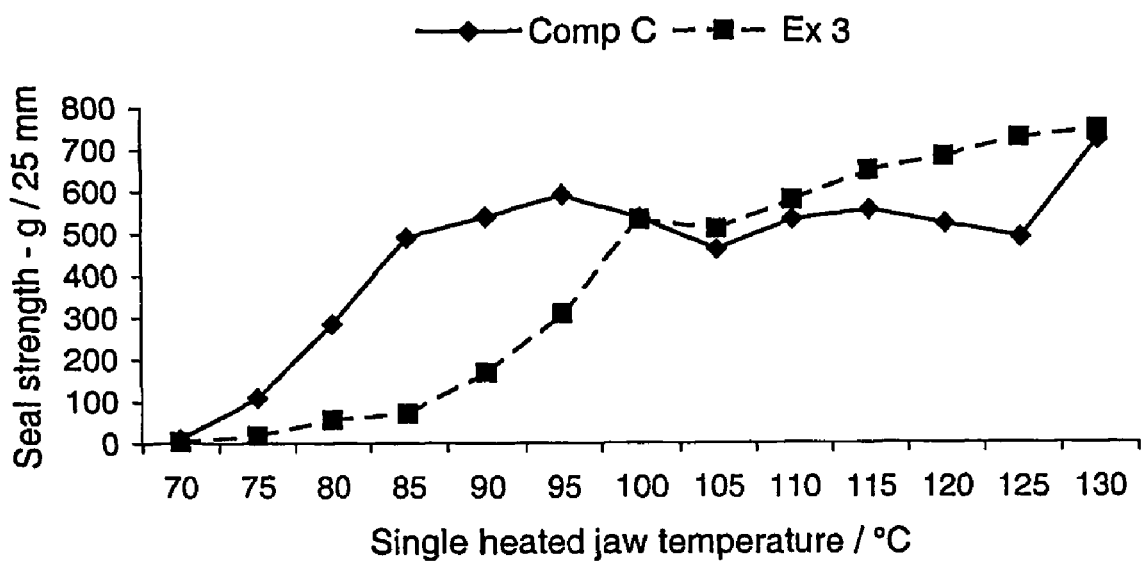
FIGS. 3 to 5 show the sealing properties of various films of the invention and prior art films and correspond to the data in respectively Tables 3 to 5.
Figure 4:
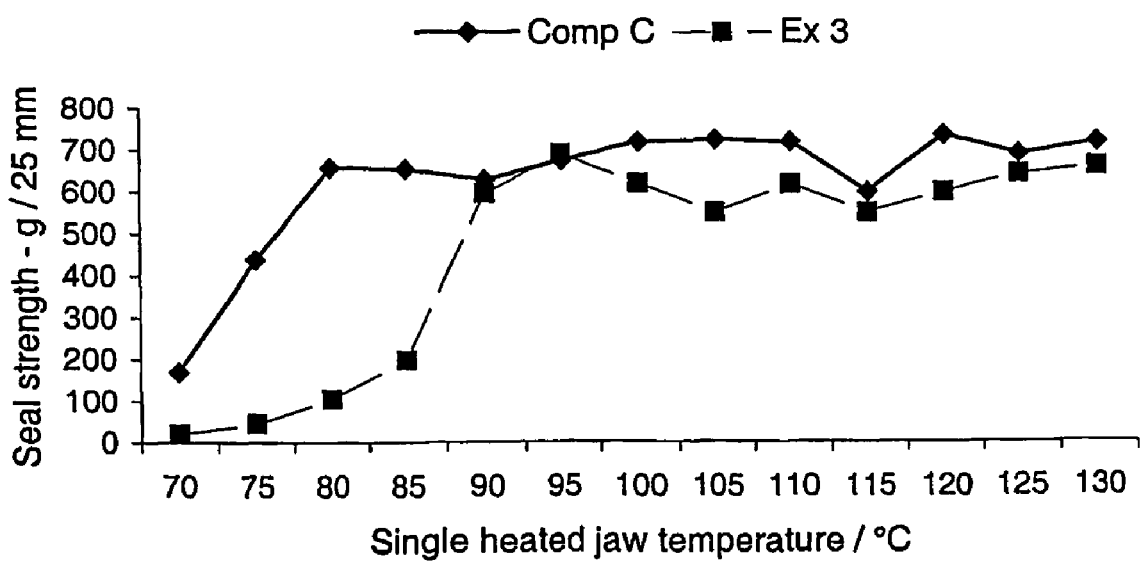
Figure 5:
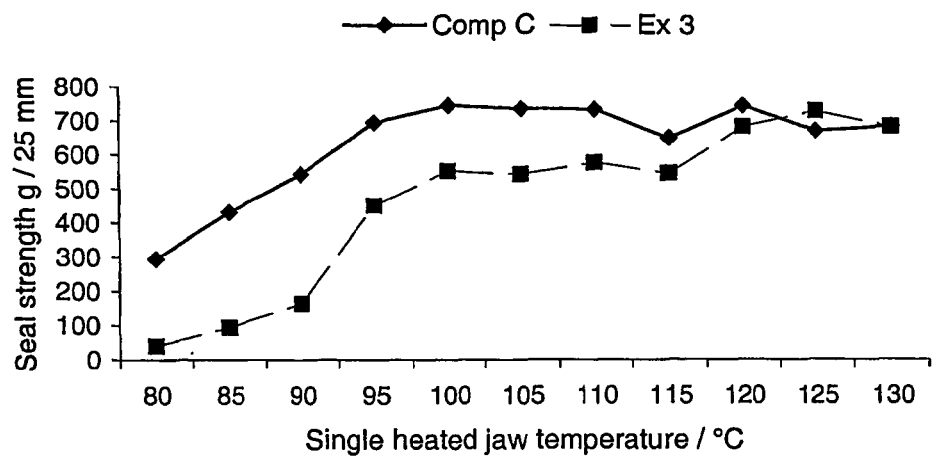

FIGS. 3 to 5 show the sealing properties of various films of the invention and prior art films and correspond to the data in respectively Tables 3 to 5 herein.

Figure 6:
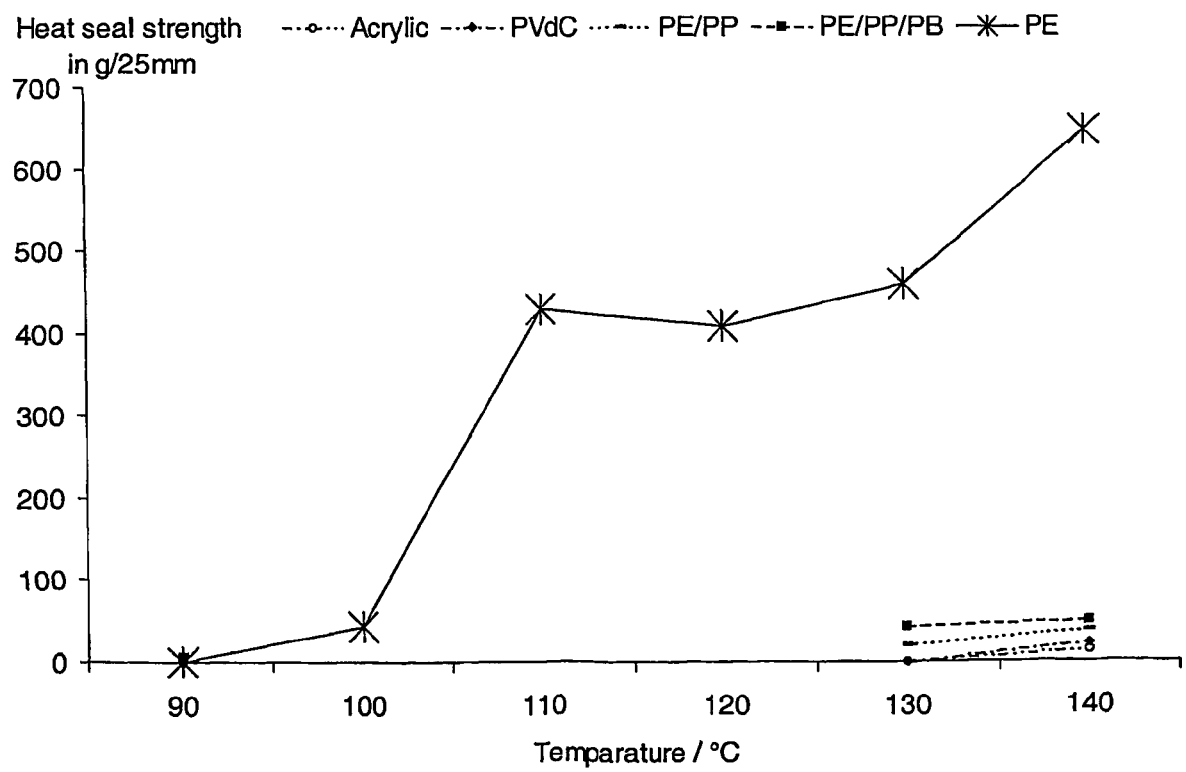
FIG. 6 illustrates the respective A to B seal strengths of various films using as the A side a preferred LTSC coating comprising polyethylene (PE) as the second polymer component of the LTSC.

FIG. 6 illustrates the respective A to B seal strengths of various films using as the A side a preferred LTSC coating as described herein comprising polyethylene (PE) as the second polymer component the LTSC. Thus FIG. 6 shows the effect when the polyolefin of the B side is not matched to the second polymer of the LTSC in the A side as there is poor sealability when the B side comprises a coating of acrylic acid (labelled acrylic), polyvinylidene (labelled PVdC) a polyethylene/polypropylene random copolymer (labelled PE/PP) or a polyethylene/polypropylene/polybutylene random terpolymer (labelled PE/PP/PB) but good sealability to a B side of polyethylene (labelled PE).

Other aspects of the invention are given in the claims.

The films of the present invention are now illustrated by the following examples which are non limiting.

Conventional standard test methods well known to those skilled in the art and/or described herein were employed in assessing films according to the invention: measuring cold fog and other properties of the films. These results were listed in the Results section below which show that films according to the invention exhibit improved properties.

The films coated as described in the examples were BOPP films prepared as follows. An isotactic propylene homopolymer as core polymer and a terpolymer of propylene, ethylene and butylene as the skin polymers were coextruded from a triple channel annular die to form a polypropylene film having a core layer and skin layers on either surface thereof. The resultant polypropylene tube was then cooled by passage over a mandrel within the tube, and externally quenched by passage through a water bath surrounding the mandrel, heated to stretching temperature, expanded by internal gas pressure, and withdrawn from the expansion zone at a rate greater than that at which it was fed thereto, so that the tube was stretched to seven times its original dimensions in both the direction of extrusion and in a direction transverse thereto. The stretched tubular film was then opened out to form flat film which was subsequently heat-set at a temperature of 120° C. on a matt-surfaced roller heat-setter of the kind described in GB-A-1124886 to form a BOPP film suitable for use as a substrate in the examples herein.

Before coating the heat-set BOPP film prepared as described above was discharge treated by a single aluminium rod electrode extending across the entire width of the film, and connected to a Sherman GT60, 6 kilowatts, solid state corona treater, operating at 2 amps. The surface(s) of the film to be coated was primed in a conventional manner and then the coatings described in the examples herein were applied from a coating head directly onto the film web.

The anti-mist properties of certain films herein were evaluated by the naked eye in conventional tests against given standards. Film appearance was assessed on a sliding scale of 1 to 5 as defined below, and these assessment ratings were given in the Tables and Figures herein.

"1" denotes a very poor anti-mist performance where an opaque layer of small fog droplets was seen, with zero visibility and poor light transmission through the film;

"2" denotes a poor performance with an opaque layer or transparent layer of large droplets, also with zero visibility and poor light transmission through the film;

"3" denotes a poor performance with a complete layer of large transparent drops, poor visibility, a lens effect seen on the film and dripping from the film;

"4" denotes a good performance with randomly scattered or large transparent drops and a discontinuous film of water on the film; and "5" denotes an excellent performance where the film is completely transparent with a clear glass-like appearance with no visible signs of water.

EXAMPLE 1 AND COMPARATIVE EXAMPLE A (COMP A)

Comparing Anti-Mist Agents

A film of the present invention (Example 1) and a comparative example (Comp A) were prepared with the same LTSC but with different ant-mist agent to show the improved properties of the films of the present invention. The anionic surfactant Empicol CBJS was chosen in Comp A for its structural similarity to the other anti-mist agents also investigated herein. The following LTSC formulation was used for Comp A and Example 1 and was applied at a coat weight of about 0.75 g/$m^2$.

| Material | Dry solids % | Wet make up |
|---|---|---|
| Aquaseal 1211 (EAA copolymer) | 84.7 | 76.26 |
| Micronised PE wax/ PE wax emulsion (anti block and slip agent) | 10.0 | 3.59 |
| Fumed silica (average particle size 3 to 5 microns) | 0.3 | 0.338 |
| Anti-mist agent (see below) | 5.0 | 4.09 |
| Water | | 15.73 |
| Total | 100.0 | 100.0 |

To make Example 1 the anti-mist agent used was the non-ionic agent available commercially from BASF under the trade name Lutensol A8. To make Comp A the anti-mist agent used was the anionic agent available commercially under the trade name Empicol CBJS.

Each film was then tested for anti-mist performance at 5° C. in a conventional manner. The temperature of the cabinet set at 5° C. fluctuated between 3° C. and 7° C. The anti-mist results are shown in FIG. 1 herein and Table 1 below:

TABLE 1

| Time | Comp A | Ex 1 |
|---|---|---|
| 1 min. | 1 | 1 |
| 5 mins. | 1 | 1 |
| 10 mins. | 1 | 1 |
| 20 mins. | 1 | 2 |
| 30 mins. | 1 | 2 |

TABLE 1-continued

| Time | Comp A | Ex 1 |
|---|---|---|
| 1 hr. | 1 | 3 |
| 2 hrs. | 1 | 5 |
| 3 hrs. | 1 | 5 |
| 6 hrs. | 1 | 5 |
| 1 day | 1 | 5 |
| 2 days | 1 | 5 |
| 4 days | 1 | 5 |
| 7 days | 1 | 5 |

These results show that the ionic Empicol CBJS does not give adequate anti-mist to the coating even at 5% dry addition. Comp A remained misted for longer than a week. The mist layer consisted of very fine water drops. In contrast Example 1 with Lutensol as an anti-mist agent gave improved performance compared to the prior art Comp A film with the anionic anti-mist agent.

Anti-mist properties of films of the invention have also been tested against otherwise identical films films using other anionic anti-mist agents (such as the sodium dodecyl diphenyloxide disulphonate available commercially under the trade name Dowfax 2A1 and the straight chain dodecylbenzene sulphonic acid available commercially under the trade name Arylan S) and other cationic anti-mist agents. Similar results were obtained showing the improved anti-mist performance of non-ionic agents in films of the present invention.

EXAMPLE 2 AND COMPARATIVE EXAMPLE B (COMP B)

Cold-Warm Cycle

More than one sample of each film was tested as described in successive stages (i) to (iii) below. The films tested below were as follows.

Comp B is a conventional BOPP film available from UCB Films under the trade designation FFA 30 which has a conventional chlorine free LTSC on one side (that available commercially under the trade name Aquaseal 1211 and which has no anti-mist agent therein) and a conventional acrylic coating on the other.

Example 2 is a BOPP film which has a same LTSC on one side as Comp B and is corona treated but uncoated on the other side. The LTSC also comprises as an anti-agent 5% of Lutensol from BASF.

Stage (i)

Firstly the films were held for 2 hours at 2° C. More than one sample was tested and all Example 2 samples became clear after 2 hours. No sample of Comp B showed any improvement over this time—all were badly misted.

Stage (ii)

After stage (i) the films were held at three hours at room temperature. At the end of the three hours the appearance had worsened on all of the Comp B samples. Water droplets had spread across and appearance was patchy.

Stage (iii)

After stage (ii) the films were returned to 2° C. and further tested for their anti-mist properties as before. Film appearance was classified in Table 2A below.

TABLE 2A

| Time | Comp B | Example 2 |
|---|---|---|
| 1 min. | 1 | 1 |
| 5 mins. | 1 | 1 |
| 10 mins. | 1 | 1 |
| 20 mins. | 1 | 1 |
| 30 mins. | 1 | 1 to 2 |
| 1 hr. | 1 | 2 |
| 3 days | 1 | 4 |

EXAMPLE 3 AND COMPARATIVE EXAMPLE C (COMP C)

Anti-Blocking Performance

The films tested below were as follows.

Comp C is a conventional BOPP film available from UCB under the trade designation FFA 30 where the film is coated on one side with a conventional LTSC and the other side is uncoated.

Example 3 is a BOPP film which has a same LTSC on one side as Comp C above with the additional thereto of 5% of the anti-mist agent, Lutensol from BASF and is uncoated on the other side These films were evaluated by measuring blocking at pressures of up to 135 psi to simulate the pressures exhibited by a film at in the core of a film reel. Various other properties of both films were tested in a conventional manner.

Results

Haze

The wide angle haze (WAH) and narrow angle haze (NAH) of the films was measured in a conventional manner and in conventional units and was found to be within acceptable limits (see Table 2B below).

TABLE 2B

| | Desired target | Typical measured values | Method | Significance |
|---|---|---|---|---|
| WAH (surface layer effect) | <3.5 | 2.5-3 | ASTM D1003 | Loss of film clarity above about 4.5 |
| NAH (core layer effect) | <15 | 4-8 | ASTM D1044 | Loss of film clarity above about 20 |

Anti Mist Performance

The film of the invention gave good anti-mist performance under cold fog tests. The appearance reaches 4/5 level after 6 hours and continued to improve and has a better anti-mist performance than an existing film (that available from UCB under the trade designation RK30). See Table 2C below and FIG. 2 herein.

TABLE 2C

| | Time/mins | | | | | Time/Hours | | | | Time/Days | | | | |
|---|---|---|---|---|---|---|---|---|---|---|---|---|---|---|
| | 1 | 5 | 10 | 20 | 30 | 1 | 2 | 3 | 6 | 1 | 2 | 3 | 4 | 7 |
| Ex 3 | 5 | 4 | 4 | 4 | 4 | 4 | 4 | 4.5 | 4.5 | 5 | 5 | 5 | 5 | 5 |
| RK30 | 4 | 4 | 4 | 2 | 2 | 4 | 4 | 5 | 5 | 5 | 5 | 5 | 5 | — |

Seals

The addition of anti-mist agent to the conventional LTSC pushed up the seal threshold by about 10° C., but the seal strengths were not affected at 130° C. Theller seal curves were produced at 15 psi/0.5 sec, 15 psi/2 sec and 60 psi/0.45 sec. These seal curves are shown in FIGS. 3 to 5 herein.

Blocking

The initial blocking strengths were around 70 g/25 mm to 80 g/25 mm. The results are shown in the Figures herein. The reels were rewound a week later to check the blocking. Example 3 with 500 ppm silica in the PE skin had no problems and ran well at 450 m/min.

TABLE 3

Theller seals at 15 psi, 0.5 s.

| Seal str. g/25 mm | Single heated jaw temperature/° C. | | | | | | | | | | | | |
|---|---|---|---|---|---|---|---|---|---|---|---|---|
| | 70 | 75 | 80 | 85 | 90 | 95 | 100 | 105 | 110 | 115 | 120 | 125 | 130 |
| Comp 3 | 10 | 108 | 284 | 490 | 539 | 591 | 536 | 461 | 532 | 555 | 523 | 490 | 722 |
| Ex 3 | 4 | 18 | 56 | 71 | 168 | 309 | 532 | 510 | 578 | 648 | 683 | 727 | 747 |

TABLE 4

Theller seals at 15 psi, 2 s.

| Seal str. g/25 mm | Single heated jaw temperature/° C. | | | | | | | | | | | | |
|---|---|---|---|---|---|---|---|---|---|---|---|---|
| | 70 | 75 | 80 | 85 | 90 | 95 | 100 | 105 | 110 | 115 | 120 | 125 | 130 |
| Comp 3 | 168 | 436 | 656 | 652 | 627 | 673 | 716 | 721 | 715 | 596 | 732 | 687 | 715 |
| Ex 3 | 20 | 45 | 103 | 196 | 594 | 688 | 618 | 548 | 615 | 547 | 596 | 640 | 657 |

TABLE 5

Theller seals at 60 psi, 0.45 s.

| Seal str. g/25 mm | Single heated jaw temperature/° C. | | | | | | | | | | |
|---|---|---|---|---|---|---|---|---|---|---|---|
| | 80 | 85 | 90 | 95 | 100 | 105 | 110 | 115 | 120 | 125 | 130 |
| Comp 3 | 294 | 432 | 542 | 695 | 745 | 735 | 732 | 648 | 743 | 670 | 685 |
| Ex 3 | 40 | 94 | 165 | 450 | 552 | 541 | 575 | 544 | 681 | 728 | 683 |

The results show that the film of the invention (Example 3) gave no blocking problems on the coated reels, although the initial strengths to be high. Example 3 rewound without any problems at 450 m/min a week after coating. The LTSC threshold temperature is increased by about 10° C. due the additional of anti-block agent, however the rest of the properties are satisfactory with excellent anti-misting and good A/B seals. Example 3 is a film with a wide sealable temperature range and it is proven to seal through contaminants such as soap powder.

EXAMPLE 4

A film was produced as previously described with acceptable sealability and anti-mist properties acceptable or better than the specification. The coatings were made from a latex of the LTSC to gave films having acceptable blocking strengths. The film substrate used was a BOPP 27 micron thick, stiff film with a polyethylene skin polymer on one side, the other side was discharge treated. The LTSC/anti-mist coating was applied to the non skin side.

The films tested below were as follows.

Comp D is a conventional BOPP film available from UCB under the trade designation FFA 30. Example 4 is a BOPP film which has a same LTSC on one side as Comp D and where the LTSC also comprises as an anti-agent 5% of Lutensol from BASF.

Results

Blocking and Coefficient of Friction (CoF) results of Comp D and Example 4 are given below and these were measured in a conventional manner in conventional units immediately after production of the film.

| Film Sample | Blocks | | Static CoF | | Dynamic CoF | |
|---|---|---|---|---|---|---|
| | 1 | 2 | 1 | 2 | 1 | 2 |
| Comp D(a) | 100+ | 84 | 0.30 | 0.46 | 0.33 | 0.44 |
| Comp D(b) | 100+ | 64 | 0.42 | 0.55 | 0.37 | 0.45 |
| Ex 4(a) | 40 | 32 | 0.62 | 0.66 | 0.57 | 0.58 |
| Ex 4(b) | 38 | 39 | 0.63 | 0.65 | 0.51 | 0.58 |

The block strengths are significantly higher for Comp D than Example 4 and the dynamic CoF is within acceptable limits for both films.

The invention claimed is:

1. A self supporting film of polyolefinic polymer(s), the film having a first and a second surface where a first exposed surface of the film (surface 'A') comprises a polymeric low temperature sealable coating (LTSC) and where the second exposed surface of the film (reverse side surface 'B') comprises an olefinic polymer capable of forming a seal to the LTSC at a minimum temperature of at most about 100° C. when measured at 15 psi for 2 seconds, such that the first and second surfaces of the film have a mutual heat seal strength (A to B) of at least about 200 g/25 mm, when measured at 15 psi for 2 seconds at 120° C.; where the LTSC also comprises:

(a) an anti-block additive in from an effective amount to about 15% by dry weight of the coating to give a static coefficient of friction of less than about 0.9 and a dynamic coefficient of friction less than about 0.75, such the first and second surfaces have a mutual blocking strength (A to B) of less than about 25 g /25 mm measured at 40° C. and 0.5 psi for one hour;

(b) a non-ionic anti-mist additive having an HLB value of up to about 20 in an effective amount to about 15% by dry weight of the coating; such that the film exhibits a substantially clear appearance on exposure to a relative humidity of at least 30% at 5° C. after one hour; and (c) optionally an anti-slip additive of a mean particle size of from about 3 to about 5 microns in an effective amount up to about 0.5% by dry weight of the coating.

2. A film as claimed in claim 1 in which the LTSC comprises: one or more copolymer(s) obtained from at least one first polymer precursor and at least one second polymer precursor where:

(i) the first polymer precursor(s) comprises at least one α, β-ethylenically unsaturated carboxylic acid and/or other suitable derivatives thereof, (ii) the second polymer precursor(s) comprises at least one olefinic polymer precursor.

3. A film as claimed in claim 2, in which the first polymer precursor is selected from acrylic acid, methacrylic acid, maleic acid, crotonic acid, itaconic acid and/or citraconic acid and/or mixtures thereof.

4. A film as claimed in claim 2, in which the first polymer precursor(s) is present in the LTSC copolymer in an amount from about 2% to about 35% by weight of the copolymer.

5. A film as claimed in claim 4, in which the first polymer precursor(s) is present in the LTSC copolymer in an amount from about 10% to about 35% by weight of the copolymer.

6. A film as claimed in claim 2, in which the second polymer precursor(s) are selected from: ethylene; propylene, butylene and/or suitable mixtures thereof.

7. A film as claimed in claim 2, in which the second polymer precursor(s) is present in the LTSC copolymer is present in an amount from about 65% to about 98% by weight of the copolymer.

8. A film as claimed in claim 2, in which the second polymer precursor(s) is present in the LTSC copolymer is present in an amount from about 65% to about 90% by weight of the copolymer.

9. A film as claimed in claim 1, in which the polyolefinic polymer of side B is obtained from at least 70% of an olefinic polymer precursor by weight of the olefinic polymer.

10. A film as claimed in claim 1, in which the polyolefinic polymer of side B is obtained from ethylene, propylene or butylene monomer.

11. A film as claimed in claim 1, in which the polyolefinic polymer of side B is obtained from the same polymer precursor as the second polymer precursor of the LTSC copolymer of side A.

12. A film as claimed in claim 1, which exhibits mutual heat seal strength (A to B) of at least about 400 g/25 mm when measured at 15 psi for 2 seconds at 120° C.

13. A film as claimed claim 1, which exhibits a blocking strength (A to B) of less than about 25 g/25 mm measured at 40° C. and 0.5 psi for one hour.

14. A film as claimed in claim 1, which at a relative humidity (RH) of 30% or more, exhibits a substantially clear appearance after at least 30 minutes at 2° C. after prior exposure to a temperature of 30° C. or more for at least 30 minutes.

15. A film as claimed in claim 14, in which the RH is greater than 50%.

16. A film as claimed in claim 1, in which the anti-block additive is present in the LTSC in an amount from about 5% to about 12% by dry weight of the coating.

17. A film as claimed in claim 1, in which the anti-block additive has a mean particle size of from about 0.1 microns to about 0.5 microns.

18. A film as claimed in claim 1, in which the anti-mist additive is present in an amount from about 0.1% to about 10% by dry weight of the coating.

19. A film as claimed in claim 1, in which the anti-mist additive has an HLB value of up to about 14.5.

20. A film as claimed in claim 1, in which the anti-mist additive has an HLB value of from about 10 to about 14.

21. A film as claimed in claim 1, in which the anti-mist additive is selected from

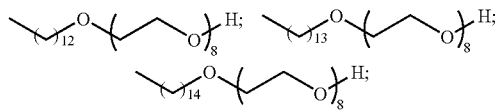

and/or mixtures thereof.

* * * * *